May 10, 1938.   K. F. HASSELMANN   2,117,003
APPARATUS FOR MAKING GEOPHYSICAL MEASUREMENTS
Filed Sept. 9, 1933   2 Sheets-Sheet 1

INVENTOR
KARL F. HASSELMANN
BY Newell & Spencer
& Safford
ATTORNEYS

May 10, 1938.    K. F. HASSELMANN    2,117,003
APPARATUS FOR MAKING GEOPHYSICAL MEASUREMENTS
Filed Sept. 9, 1933    2 Sheets-Sheet 2
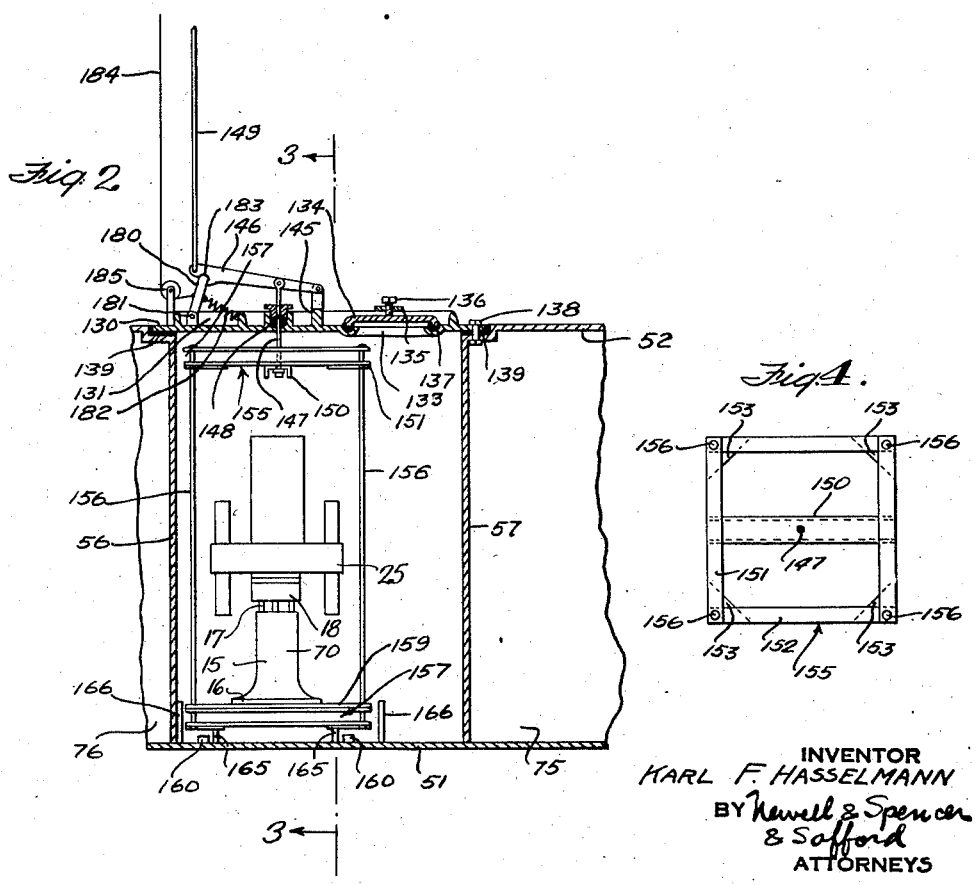
INVENTOR
KARL F. HASSELMANN
BY Newell & Spencer
& Safford
ATTORNEYS

UNITED STATES PATENT OFFICE 2,117,003

APPARATUS FOR MAKING GEOPHYSICAL MEASUREMENTS

Karl F. Hasselmann, New York, N. Y., assignor, by mesne assignments, to The Salt Dome Oil Corporation, Houston, Tex., a corporation of Delaware Application September 9, 1933, Serial No. 688,754

4 Claims. (Cl. 265—1.5)

This invention relates to apparatus for making measurements, commonly known as geophysical measurements, for determining the character of the earth's sub-surface structure. In particular it relates to making such measurements and determinations for portions of the earth's sub-surface structure which are covered by water.

The methods of making geophysical measurements on land are well known and understood. They include determinations of various kinds by measurements based on differences in the mass, or of the density of the different materials, rocks, ores, deposits of different kinds, strata or veins in the earth's structure or on their electrical conductivity, magnetic qualities, radio-emanations or their capacity for the propagation of shock. Measurements based on mass differences usually are made by means of the torsion balance. Other determinations made by the seismograph are based on the differences in the rate of transmission of shock or vibration by the materials of different character existing in the earth, the vibrations being artificially produced as by setting off a charge of explosive. Still other methods utilize electrical resistance, electro-chemical, magnetic and radio activity measurements. All such methods require that the measuring instrument be placed and maintained in a definite known position and usually that it be fixed or firmly or stably positioned with respect to the earth against unintended movement, displacement or jar. In many cases the instrument also must be accessible.

Particularly in using the torsion balance and the seismograph is it necessary that the instrument be stably or firmly held with respect to the earth or that it be in fixed contact with the earth while observations are being taken or while the recording devices are in operation. The sensitiveness of these instruments to all vibrations and to external forces and the small degree of deflection which they record require that the supporting member be of such design or of such mass or both that it will hold the instrument and its recording devices stable or firmly in the position upon the ground in which they are set. Such support also may be necessary with other geophysical instruments.

Heretofore no convenient and flexible method has been proposed for properly fixing or supporting with sufficient stability and firmness with respect to the earth geophysical instruments in positions to obtain surveys of portions of the earth surface covered by bodies of water. In some cases resort has been had to placing such instruments on piles driven into the mud or other penetrable bottom of such bodies of water. Not only is such a method limited to surveying the earth structure near to shore, i. e. in relatively shallow water, but observations free from distortion and error due to the movement of the water and the wind acting on the pile or on the instrument housing or on both have been unavoidable. Moreover, such operations are limited to locations where the bottom underlying the water is such that piles may be driven, unless structures of prohibitive cost are built. As a large number of observations and determinations usually must be made in different locations, resetting of the instrument in these different locations becomes not only laborious but entails a large expense.

By use of my invention I am able to overcome these difficulties not only with less cost to complete a survey of given scope but also with greater accuracy and with a considerable saving in time. I obtain greater accuracy by insuring that the geophysical instrument is firmly or stably positioned relative to the portion of the earth being surveyed underlying the body of water and by protecting it against influence of the water movement and the wind action upon the water. This I accomplish by submerging the instrument while protecting its operating parts from contact with the water. I so effect submersion that the instrument rests firmly at the bottom underlying the body of water. Moreover, I arrange my apparatus so that while the instrument may be readily submerged and firmly or stably held in relation to the bottom it may also easily be raised again to the water surface and relocated and re-submerged in a different position.

The means by which I preferably carry out these methods include a chamber in which the instrument may be mounted, said chamber being so constructed as to be submersible and also to be watertight unless the instrument being used is of such type that it may be subjected to contact with water or itself is provided with a watertight casing. The mass of the structure of said chamber is such as to be substantially immovable when submerged and free from the influence of the wind and water movement. In practice I propose to carry the instrument in a vessel capable of transportation through or upon the water surface so that movement to different locations is facilitated, said vessel having means by which it may be readily submerged and, after the observations or records have been made, may be again raised to the surface.

The invention will be more clearly understood from the following description in connection with the drawings in which Figure 1 shows the vertical longitudinal section of a submerged vessel having mounted therein a geophysical instrument.

Figure 2 shows a section of a submersible chamber enclosing a torsion balance.

Figure 4 is a plan view of the suspension means shown in Figures 2 and 3.

Figure 1:
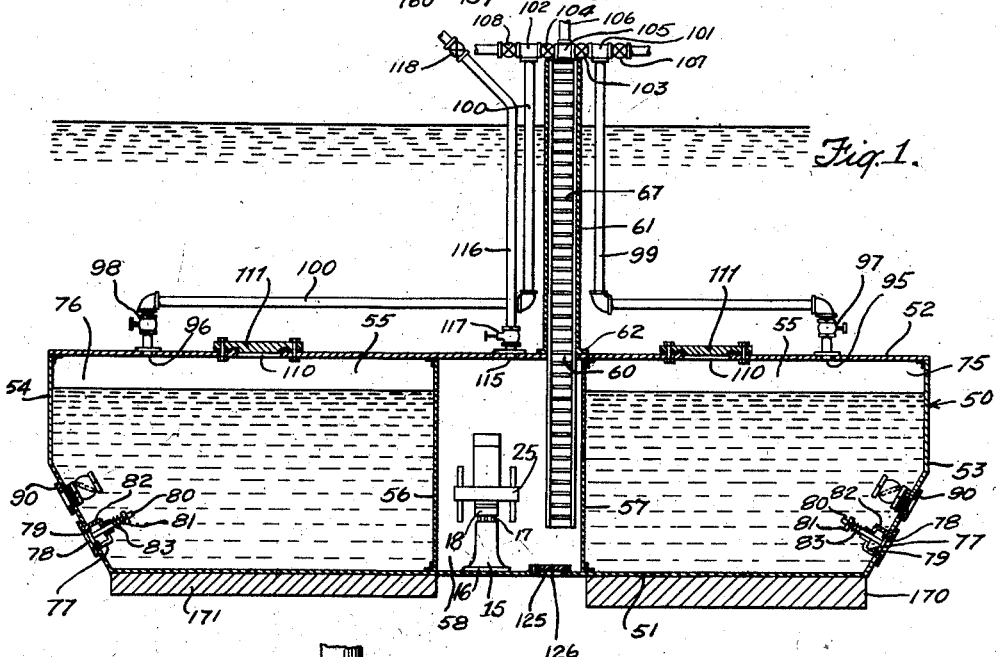

In Figure 1 is illustrated diagrammatically a vessel 50 of barge type having a flat bottom 51 and a deck 52. The ends of the barge 53 and 54 extend at right angles to the side wall 55 and to the opposite side wall parallel to the wall 55. The walls 53 and 54 are each formed in two planes at an angle to each other to provide a structure which may be readily moved upon the surface of the water. Within the vessel transverse partitions 56 and 57 extend between the side walls and are made watertight to said side walls and to the deck 52 and to the bottom 51 of the vessel. Preferably, the partitions are asymmetrically placed in the length of the vessel for reasons hereafter explained. There thus is constructed within the vessel a chamber 58, access to which is provided through an opening 60 having connected thereto a stack or access pipe 61 erected vertically over said opening and of such length as may reach to and above the surface of the water when the vessel is submerged as hereafter to be described. Said stack is provided with a flanged portion 62 which may be bolted or fastened by other means, not shown, to the deck and made watertight thereto as by means of a gasket. Within the stack or access pipe 61 is placed a ladder 67 reaching from the upper end of the access pipe 61 to a point near the bottom of the vessel, thus providing access to the chamber 58.

Within the chamber 58 is mounted a geophysical instrument 70 of any desired type and which, in the embodiment illustrated in Figure 1, is a torsion balance having a pedestal 15 provided with a flange 16 firmly bearing upon the floor of the chamber 58. The instrument illustrated is of the type having two beams in the form of elongated Z's with their shanks parallel and horizontal and with their legs extending oppositely upward and downward in the vertical tubes of the casing 25. The chamber 58, for example, may be about 4 feet in width between the partitions 56 and 57 and may extend for the full width of the vessel. In such a practical embodiment the width of the barge or vessel may be 7 to 8 feet and the length thereof may be about 30 feet. The height of the chamber as provided by the depth of the vessel between the deck 52 and the bottom 51 may be about 6 feet or of such height as to provide head room within the chamber 58. However, vessels of different size, dimensions and proportions and having chambers of different size than given in the example may be used. There is thus provided within the chamber 58 a space in which the operator may conveniently move to make the adjustments and settings of the geophysical instrument such as the torsion balance which has been described above. The instrument may be leveled by means of the leveling screws 17, the clockwork thereof contained in the box 18 may be set and other common adjustments and settings necessary with instruments of the type as used on land may be made.

The partitions 56 and 57 separate the chamber 58 from compartments 75 and 76, which are provided with means by which they may be flooded with water. In each end wall of the barge, as shown in Figure 1, is inserted a valve 77 which is provided with a disk seating, when closed, upon the seat 79. A stem 80 has a collar 81 between which and the body 82 of the valve a spring 83 is placed under compression. This spring normally holds the disk 78 upon the seat 79, thus closing the compartments 75 and 76 against entrance of water thereinto from outside the vessel. The spring 83 is so designed that a pressure outwardly upon the disk 78 sufficient to overcome the compression force of the spring will open the valve and permit passage of water through the valve from the compartments 75 and 76 to outside the vessel.

At 90 are shown check valves of common type connected to openings in the end walls 53 and 54 of the vessel and so placed that they permit passage of water therethrough from outside the vessel into the compartments 75 and 76 but prevent the passage of water or air from within the compartments 75 and 76 outwardly and located below normal water line when the barge is in floating position.

At 95 and 96 are shown openings in the deck of the vessel leading respectively to the compartments 75 and 76. Connected to these openings through stop valves 97 and 98 are pipes 99 and 100 respectively leading to T's 101 and 102 in a header in which is inserted a T 105 having connected to its side outlet a pipe 106 leading from an air pump or compressor which may be located upon an auxiliary vessel. Valves 103 and 104 are inserted at either side of the T 105 to control the delivery of the air respectively to the pipes 99 and 100. On the opposite side of the T's 101 and 102 are vent or release valves 107 and 108 associated respectively with the pipes 99 and 100.

When the valves 97 and 103, associated with the pipe 99, and the valves 98 and 104, associated with the pipe 100 are open, the valves 107 and 108 being closed, air may be forced into the compartments 75 and 76 respectively through the pipes 99 and 100. If these compartments previously have been flooded with water the vessel will be submerged, as shown in Figure 1. When the air pressure within the compartments 75 and 76 by forcing the air thereinto has been raised to a point to bring upon the disk 78 a pressure sufficient to overcome the static head of water due to the depth at which the vessel is submerged, the force of the spring 83 will be overcome, the valves 77 will open and water will flow from the compartments 75 and 76 to the outside of the vessel. Thus, the water within the compartments may be removed at least up to the level of the valves 77, which preferably are placed as low as possible within the vessel. However, they preferably are not placed in the bottom wall 51 of the vessel or so low in the end walls of the vessel that they may become clogged with mud or with marine life growing upon the bottom underlying the water. Thus there may be left within the compartments 75 and 76 a certain amount of water when the vessel is being raised or when it is floating. The design of the vessel, however, is such that when the water has been forced from the compartments 75 and 76 to the level of the valves 77, sufficient buoyancy will be provided to raise the vessel from the bottom and to cause it to float upon the surface of the water. It will be clear that only sufficient water need be removed from the compartments 75 and 76 to accomplish this result.

During the operation just described the valve 90 will remain closed due to the outwardly acting pressure within the compartments 75 and 76. It will be noted that the valves 90 are placed low in the walls 53 and 54 of the vessel. They may be placed as shown just above the valves 77 or may be placed at one side thereof and on the same level. These valves should be in such position that when the vessel is floating they are submerged in order that upon release of the air pressure within the compartments 75 and 76 the water may enter through said valves 90. This release of the air may be accomplished by opening the valves 107 and 108, the valves 103 and 104 having been previously closed. If the valves 103 and 104 have been kept open so that, for example, air might be supplied therethrough to the compartments 75 and 76 to make up for leakage, the valves 103 and 104 should be closed before opening the valves 107 and 108. In either case the air, which is under a pressure in the compartments 75 and 76 necessary to hold the valves 90 closed and to give buoyancy to the vessel, escapes to the atmosphere through the release valves 107 and 108. If the pressure in the compartments 75 and 76 is thus reduced, water may enter through the valves 90. The compartments 75 and 76 gradually fill with water, the buoyancy of the vessel is lost and it settles in the water and finally sinks to the bottom.

In order to control the speed with which the vessel settles in the water so that it may not strike the bottom with force and thus disturb the adjustment of the instruments positioned in the chamber 58 and also to maintain the vessel in substantially a horizontal position while moving toward the bottom so as not to derange and injure the delicate parts of the instrument, the valves 108 and 107 may be throttled to limit the amount of air escaping therethrough. If the speed of settling is too great further throttling of these valves will reduce the rapidity with which the air escapes and thus slow up the speed at which the vessel submerges. On the other hand, the speed of submersion may be increased by increasing the opening of the valves 107 and 108 to allow the air to escape more rapidly therethrough.

Moreover, in order to maintain the vessel in its horizontal position while submerging, the air escaping from one chamber or the other may be throttled to a greater or less extent than that escaping from the other chamber. The asymmetrical position of the chamber 58 mentioned above produces an asymmetrical buoyancy of the compartments 75 and 76, that is of the vessel as a whole. The control provided by the valves 107 and 108, therefore, may be used to compensate for the difference in buoyancy of the compartments 75 and 76 while submerging.

Likewise control of the valves 103 and 104 to admit the air at a greater or less rate to the compartments 75 and 76 may be utilized to compensate the difference in buoyancy between the chambers when the vessel is being raised. Thus the vessel may be raised to a level position from the earth floor underlying the water and raised to the surface in a substantially horizontal position. On the other hand, by suitable design of the compartments and by properly controlling the escape or delivery of the air, the vessel may be lowered or raised in an inclined position, for example that of its position on the bottom, in order to minimize the disturbance of the working parts of the instrument. Such methods of submerging and raising the vessel are desirable or necessary depending upon the type of instrument located in the chamber 58 and in order to maintain substantially lever or vertical positions as the case may be which are required for making and recording measurements and to avoid damage to the delicate parts of the geophysical instrument.

Thus there is provided means by which the geophysical instrument 70 may be positioned firmly in relation to the earth floor underlying a body of water and means by which the instrument may be raised to the surface, transported to a new location as by towing the barge, and again sunk to the bottom for observations and registrations in the new location. In depths of water not greater than the height of the access tube 61 above the bottom of the vessel, the vessel may conveniently be raised and lowered by the method described without providing for the sealing of the chamber 58. When desired, access to the compartments 75 and 76 may be had through the openings 110 closed by plates 111 fastened with suitable fastenings and gaskets or other means for providing a water and air tight closure.

For the pipes 99 and 100 may be substituted flexible hose of suitable construction to carry the air under pressure, the control valves 103, 104, 107 and 108 conveniently being located on the auxiliary vessel. In some cases such hose may be more convenient and may be preferable to avoid transmission of shock induced by wave motion on the surface of the water or from other causes.

When the surface of the water is rough under wind action or swell, which may cause vibration or shock to be transmitted through the stack or access tube 61 to the chamber 58 or when the observations are to be taken in depths of water exceeding a convenient height of the access pipe 61 or when otherwise more convenient or suitable, said pipe may be removed by disconnecting the flange 62 from the deck and the opening 60 may then be closed with a cover plate providing a watertight closure for the chamber 58.

At 115 is shown an opening into the compartment 58 to which a pipe or hose 116 is connected provided with a stop valve 117 at the deck and a control valve 118. To the valve 118 by suitable piping may be connected an air compressor located on the auxiliary vessel or in other convenient position to supply the chamber 58 with air under pressure.

When observations are to be taken at considerable depths the barge or vessel may be lowered and raised in the manner described above, it being merely necessary to connect the valve 103 and the valve 118 by suitable piping or flexible hose leading from the compressors or the air pumps on the auxiliary vessel. The observer or operator of the instrument 70 may enter the chamber 58 when the vessel is floating on the surface of the water and the opening 60 may be closed by the cover plate referred to above. The vessel may be submerged by releasing the air from the compartments 75 and 76. Air may be supplied through the pipe 116 to provide an oxygen supply for the operator. The adjustments and settings of the instrument 70 may be made in the manner referred to above as when the operator is able to enter the chamber 58 through the access pipe 61. When the cycle of observations and registrations is complete the barge may be raised and removed to a new location for new observations as mentioned above.

Figure 5:
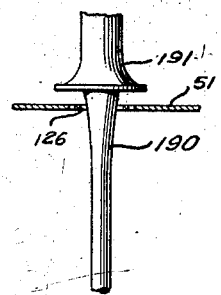
Figure 5 shows the base and stem of a seismograph.

When observations and registrations upon a seismograph or other instrument, such as electrical instruments for measuring earth resistance, which require actual contact of a portion or part of the instrument with the earth, this contact may be secured through an opening 125 in the portion of the bottom of the vessel which forms the floor of the chamber 58. This opening normally is closed by a cover plate 126 suitably fastened to form a watertight closure. When the chamber 58, by delivery of the air through the pipe 116, is put under pressure sufficient to overcome the static head of the water outside the vessel, the cover plate 126 may be removed and water will be prevented from entering the chamber 58 by said air pressure within the chamber. If, for example, observations on a seismograph are to be taken, the stem 190 as shown in Figure 5, which projects below the base 191 of the instrument, may be projected through the opening 125 and inserted into the earth bottom upon which the vessel is resting. When the observations and registrations of an artificially produced shock have been made the seismograph may be withdrawn from the opening 125 and the opening again closed. Thereafter the pressure within the chamber 58 may gradually be reduced to an amount sufficient only to supply the oxygen for the operator until the vessel again is raised to the surface.

Figure 3:
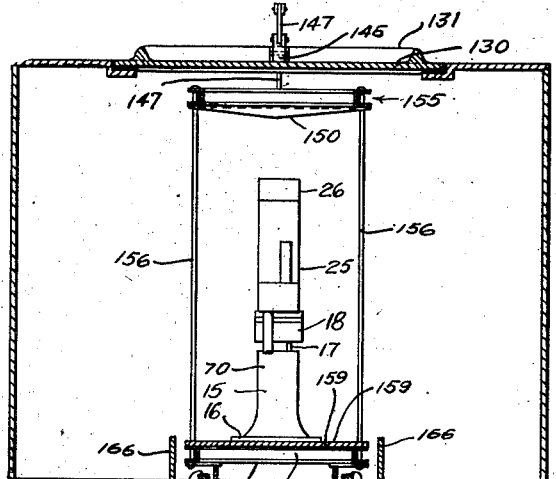
Figure 3 is a section on line 3—3 of Figure 2.

In Figure 2 is shown an enlarged view of the chamber 58 of the vessel 50 located between the compartments 75 and 76 and separated therefrom by the walls 56 and 57 as illustrated in Figure 1. However, in the embodiment shown in Figure 2, of which a transverse section is shown in Figure 3, a portion of the deck 52 extending over the chamber 58 is made removable. This portion comprises a plate 130 provided with stiffening ribs 131 of suitable design. In the plate 130 is formed a manhole opening 133 having a manhole cover 134 of common design held by crossbar 135 and screw 136 against a gasket 137 to provide a tight joint. The plate 130 is made watertight to the deck by means of bolts 138 and gasket 139. The plate 130 thus may be removed to permit insertion of the geophysical instrument within the compartment 58 or its withdrawal therefrom. Ordinary access to the compartment for preliminary setting, adjustment or testing of the instrument may be had through the opening 133. Fastened to the cover plate 130 is a stand or bracket 145 having pivoted to its upper end a lever 146. Connected at a point intermediate the ends of the lever to suitably provide a proper leverage as well as proper vertical motion is a cable 147 passing through a stuffing box 148 of suitable design to prevent water entering therethrough around the cable 147 into the chamber 58.

The lower end of the cable 147 is attached to a rigid bridge bar 150 shown also in Figure 4. Said bridge bar is fastened at its ends to the cross members 151 of a rectangular frame 155 constructed with rigid members 152 parallel to the bridge bar 150. Gusset plates 153 are provided at the corners and are suitably fastened by rivets or other fasteners to the frame 155 to provide in said frame a rigid member hung upon the cable 147.

From corners of the frame 155 depend cables 156 of equal length and connecting to a frame 157 of similar construction to the frame 155. The frame 157 is provided with a floor 159 upon which may be set the geophysical instrument 70.

The size of the cables 147 and 156 and the construction of the frames 155 and 157 is such as will properly support the weight of the instrument 70 when suspended by the cable 147. At the outer end of the lever 146 is connected a cable 149 leading to the surface of the water by which the lever 146 may be lifted, thus lifting through the cable 147 attached thereto the frames and the geophysical instrument supported thereby.

At 180 in Figure 2 is shown a latch pivoted at 181 upon a bracket attached to the plate 130. The latch is held by a spring 182 to bias its pivotal motion so as to position the latch under the notch 183 of the lever 146. A cable 184 passing over a pulley 185 suitably supported is so attached to the latch 180 that a pull on said cable will overcome the bias of the spring 182 and move the latch 180 from under the lever 146 so that release of the cable 149 will allow the lever 146 to be lowered.

By release of the cable 149 the device may be lowered, the cable 147 sliding in the stuffing box 148. Upon the bottom 51 of the chamber 58 are provided rests 160 of such height that when the device holding the instrument is lowered the frame 157 may rest solidly thereon, said frame being so constructed that when in contact with the rests 160 the instrument 70 is firmly supported in contact with the bottom of the vessel. With the frame 157 supported by the rests 160 the cables 156 may be slackened by still further lowering the lever 146 thus to avoid transmission of any jar from the surface of the water or from the water movement through the lifting mechanism to the geophysical instrument while the vessel is being raised or lowered.

The frame 157 with its platform 159 may be lifted, for example, about 3″ from the rests 160 in order to permit the mechanism depending from the cable 147 to hang from the cables 156 supported by the frame 155. It will be noted that by providing a flexible cable 147 the whole mechanism, including the frames 155 and 157 and the instrument 70 supported thereby, may hang in a vertical position regardless of the list or tilt of the vessel. If the instrument 70 has been leveled or otherwise adjusted for a level position when the vessel is at the surface of the water, when the frame 157 is raised above the rests 160 the instrument will assume a level position when it and its supporting device loses its swing and comes to rest.

In order to provide damping means and to limit the swing of the supporting device, flexible wipers 165 are attached to the bottom of the frame 157 and are of such length as to touch the floor of the chamber 58. These wipers are of such thickness and flexibility that they will yield under the weight of the instrument and of the platform 159 and frame 157 so that the frame 157 may rest on the rests 160 as stated above. However, they are of such stiffness and of such extent of surface in contact with the floor 51 as to provide an amount of friction which will effectually dampen the swings in any direction of the supporting device and of the instrument 70 mounted thereon. Thus when the supporting device is raised by pulling upon the cable 149 the time necessary to bring the supporting device and the instrument 70 to rest is reduced and shocks or jars by sharp swings of the device are avoided or minimized but do not prevent the instrument assuming a vertical position.

In order to limit the amount of the rotational swing about the cable 147 as an axis when the device is raised and is free to swing, bumpers 166 are provided of soft or shock absorbing material against which the frame 157 may strike if the rotation of the said frame exceeds about 5 degrees with respect to the vessel.

When the vessel having a chamber 58 equipped with the device illustrated in Figures 2 and 3 is lowered to the bottom underlying a body of water, the vessel may take a position in which the bottom floor of the vessel is not level due to settling in the mud of different consistency or due to resting upon rock or other bottom structure of irregular formation. It will be understood from the above description that when the floor 51 of the chamber 58 thus becomes inclined the supporting device shown in connection with Figures 2 and 3 may be raised as described above and the cycle of registration upon the instrument may proceed. When the cycle is complete, which may be determined by allowing an elapse of the proper amount of time, the supporting device may be lowered upon the rests 160, the vessel may be raised to the surface or may be raised from the bottom to a submerged position and towed or otherwise moved to a new location when the sequence of operations may be repeated to obtain a new set of observations.

It will also be understood that the chamber 58 as illustrated in Figures 2 and 3 may be constructed as a separate submersible chamber of such design that it may be raised and lowered by means of a derrick or by other means. In such case suitable weights may be placed at the bottom of the chamber to hold it in the upright position when submerged and to provide the mass necessary to secure immovability.

As has been stated above, in Figure 1 the chamber 58 is located asymmetrically with respect to the length of the vessel 50. It will be apparent that a difference in buoyancy of the two compartments will exist if there is no hydraulic connection therebetween. However, the chamber 58 may be so designed as to be entirely within the vessel and provide water space around its walls through which the water and air may pass from one end of the vessel to the other. Preferably, however, two compartments 75 and 76 are used without hydraulic connection therebetween in order that suitable control of the submersion of the vessel may be secured as described above.

In the embodiment shown in Figure 1 the wall 57 is placed asymmetrically in the length of the vessel with respect to the wall 56 in order that sufficient room may be secured within the chamber 58 around the instrument 70 while limiting as much as possible the size and therefore the buoyancy of said chamber. The instrument 70, particularly if a torsion balance, may be placed substantially at the center of gravity of the vessel in order that the mass of the vessel shall have no appreciable action upon the operation of the instrument, while thus limiting the size of the chamber 58. The position of the center of gravity of the vessel may be somewhat shifted from the center of the vessel, due to the position of the partition wall 57 and due to the differences in the masses of water contained in the compartments 75 and 76 when the vessel is submerged but the center of gravity of the vessel falls within the chamber 58.

Moreover, due to the difference in buoyancy of the two compartments, or otherwise stated, due to the asymmetrical position and buoyancy of the chamber 58 when the vessel is submerged, weights must be added to the bottom of the vessel to compensate for the list or tilt which otherwise would be produced. Thus, attached to the bottom of the compartment 75 is a weight 170 and to the bottom of the compartment 76 is attached weight 171. The weight 170, in order to compensate for the asymmetric buoyancy of the chamber 58, therefore, should be greater than the weight 171. However, the amount of the difference between these two weights must be modified in order that the amount of the masses at either side of the instrument shall be such that the center of gravity of the whole mass of the structure shall fall within the chamber 58 in such position that the center of gravity of the instrument 70 may be made substantially coincident therewith while at the same time providing space around the instrument as described above.

The amount of each of these weights and their total weight, taken with the mass of the vessel itself, is such as to provide the desired stability and firm positioning of the vessel upon the bottom underlying the water and they must be so great as to assist in submerging the vessel when the water is permitted to enter the compartments 75 and 76. However, these weights must not be so great as to overcome the buoyancy given to the vessel when the water is forced out of the compartments 75 and 76 by the air entering therein.

When taking measurements with a torsion balance and also with certain other instruments it is necessary to know the position of the instrument with respect to the compass directions. One method of determining this position when practicing my invention is to note the position of the instrument with respect to the compass when the vessel is at the surface of the water and to insure that it substantially maintains its position with respect to the compass directions when submerged. For example, when the vessel is to be submerged in water having a current the vessel may be towed against the current by the auxiliary vessel to the position of submerging. The compass directions may then be noted and the instrument positioned with respect thereto. The vessel may then be submerged while the auxiliary vessel maintains the position thereof by means of the tow lines. The vessel in some cases may be anchored in the current or may have its position held by several anchors while floating to permit observations of the compass and setting of the geophysical instrument. Under such conditions the vessel will substantially sink to the bottom in the position, and will lie in the direction, in which it lay upon the surface before submersion.

When access to the chamber 58 is possible for the setting and adjustment of the instrument the compass directions may be noted on a compass within the submerged chamber 58 if, as described above, the operator is within the chamber when the vessel is submerged, the chamber being supplied with air. Suitable protection from the magnetic distortion of the mass of the vessel may be necessary. In some cases, however, instruments for indicating compass directions which are of the type providing indications at a remote point may be used. The indications then may be observed at the surface on the auxiliary vessel or on shore.

It will be noted from the above description that I provide for setting and adjustment of the geophysical instruments in the submarine or submerged position either by providing access thereto in the submerged position or by means for insuring said setting and adjustments. In either case I secure proper operation of the instrument by insuring that its moving parts, including those free to be acted on by gravity, are allowed to take their proper operating positions and motions. The methods and means by which I accomplish this form part of my invention. Moreover, while securing the proper setting and operating position, I stably support the instrument while submerged so that its moving parts may properly indicate, register or record the desired geophysical measurements; also when necessary I firmly or fixedly position the instrument upon the earth's surface covered by water. Preferably I accomplish this result by means of a submersible member carrying the instrument, which member is of such mass when submerged that it will rest firmly or fixedly upon the earth's surface underlying the water and not be subject to currents and movements of the water or disturbance from marine life. However, within the scope of my invention I contemplate any method of firmly or stably positioning a geophysical instrument in a submarine location and any means for carrying out such methods.

The figures in the drawings and the description in connection therewith are merely illustrative of the principles and of the conditions under which I carry out submarine geophysical measurements according to my invention. They do not represent the only arrangements or combinations embodying my invention which might be adopted in practice by those skilled in the art. Other methods of submerging a vessel and of raising it again to the surface may be used and vessels which are self-propelling when submerged below the surface of the water and which are capable of submerging themselves, may be utilized to carry the geophysical instruments. My invention includes the use of such vessels as well as of diving bells and other submersible devices.

Various modifications of the means for stably supporting the instruments within the submerged vessel or chamber to suit the particular type of geophysical instrument and the conditions under which it operates may be used. Optical, electrical, pneumatic and other means for transmission of the registrations or indications of the geophysical instruments may be utilized to permit reading or recording at a distance. These indications or registrations also may be transmitted to the shore by running the cable or other transmitting member from the vessel to the shore. All such variations and modifications are within the scope of my invention.

What I claim is:

1. Apparatus for making geophysical measurements upon areas of the earth's surface covered by water which comprises a structure providing a water-tight chamber, a support within and carried by the structure of said chamber, said support being arranged to have mounted thereon a geophysical instrument, means for contacting said support and holding it against movement within said chamber, and means operable at will for releasing said support from said contacting means and causing said support to hold said instrument in operating position for different positions of the chamber with respect to the earth's surface.

2. Apparatus for making geophysical measurements upon areas of the earth's surface covered by a body of water which comprises a structure providing a water-tight chamber, a support within said chamber suspended from said structure and so as to swing for different positions of the chamber when submerged in said body of water into a position with respect to the earth underlying the body of water such that a geophysical instrument supported by said support may be held in operating position within the chamber, means upon which said support may bear when not in operation to hold the support against movement with respect to the chamber, and means operable at will from outside the chamber for so moving said support as to release it from said bearing and to cause it to be free to swing.

3. A vessel as in claim 1 in which means are provided for damping the swing of said support to cause said support to be at rest with respect to the earth underlying said body of water when said chamber is at rest with respect to the earth.

4. A vessel capable of floating upon a body of water covering a portion of the earth's surface and having therein a chamber, means for submerging said vessel while preventing water entering said chamber, said vessel being so constructed as to become when submerged stably positioned with respect to the earth underlying said body of water, a platform within said chamber for supporting a geophysical instrument, said platform being suspended by means so constructed and arranged that said platform for different positions of the chamber with respect to the earth may swing into position to hold said geophysical instrument in operating position with respect to the earth, means upon which said platform when not in operation may bear to hold said platform against movement with respect to the chamber, and means operable from outside the chamber and connected to said suspension means through a wall of said chamber for releasing said platform from said position of bearing to cause said platform to swing from said suspension, said last means also being operable to cause said platform again to bear upon said bearing means.

KARL F. HASSELMANN.